United States Patent [19]

Ishida et al.

[11] Patent Number: 5,577,845

[45] Date of Patent: Nov. 26, 1996

[54] SEAL DEVICE FOR ROLLING BEARING

[75] Inventors: Yasutaka Ishida; Hironori Suzuki; Shuji Sudo, all of Fujisawa, Japan

[73] Assignee: NSK Ltd., Kanagawa, Japan

[21] Appl. No.: 557,315

[22] Filed: Nov. 14, 1995

[30] Foreign Application Priority Data

Nov. 14, 1994 [JP] Japan .................................. 6-279218

[51] Int. Cl.⁶ .................................................. F16C 33/76
[52] U.S. Cl. .............................. 384/484; 277/37; 384/477
[58] Field of Search ................................. 384/477, 480, 384/484, 488; 277/37, 186, 215

[56] References Cited

U.S. PATENT DOCUMENTS

| | | | |
|---|---|---|---|
| 2,031,571 | 2/1936 | Nilsson | 384/488 |
| 2,034,567 | 3/1936 | Fernstrom | 384/488 |
| 2,718,441 | 9/1955 | Smith | 384/484 |
| 3,071,385 | 1/1963 | Greiner | 277/94 |
| 3,075,779 | 1/1963 | Holdham | 277/37 |
| 3,597,030 | 8/1971 | Hallerback | 384/488 |
| 3,672,736 | 6/1972 | Rathbone | 384/488 |
| 4,183,592 | 1/1980 | Sudo et al. | 384/488 |
| 4,660,997 | 4/1987 | Brandenstein et al. | 384/484 X |
| 5,242,229 | 9/1993 | McLarty | 384/484 |
| 5,435,654 | 7/1995 | Ishida et al. | 384/488 |

FOREIGN PATENT DOCUMENTS

| | | |
|---|---|---|
| 49-114350 | 9/1974 | Japan . |
| 54-68048 | 5/1979 | Japan . |
| 58-112733 | 8/1983 | Japan . |
| 62-167926 | 7/1987 | Japan . |
| 2-92117 | 7/1990 | Japan . |
| 5-16411 | 4/1993 | Japan . |

*Primary Examiner*—Thomas R. Hannon
*Attorney, Agent, or Firm*—Helfgott & Karas, P.G.

[57] ABSTRACT

A shield plate for use in an outer race is made from a metal plate in a circular ring shape so as to have notches on its periphery, such that part of the peripheral portions between adjacent notches are folded more strongly than the remaining peripheral portions so as to be a suitable prop for fitting into the outer race, preventing the outer race from being deformed by fitting of the shield plate.

15 Claims, 19 Drawing Sheets

Out of Roundness (μm)

SEAL DEVICE FOR ROLLING BEARING

BACKGROUND OF THE INVENTION

1. Field of the Invention

The present invention is related to a seal device for a rolling bearing, specifically a seal device installed in a miniature bearing for rotation support in a hard disc drive apparatus (HDD), a video tape recorder (VTR) etc.

2. Description of the Related Art

The rotation support section in the devices such as an HDD or VTR is made up of rolling bearings which are constructed as shown in FIG. 20 to have an outer race 1 and an inner race 3. The outer race 1 has an outer raceway 2 formed around the inner peripheral surface at its axial center portion, and the inner race 3 has an inner raceway 4 formed around the outer peripheral surface at its axial center portion. There are a plurality of rolling elements 5 located between the outer raceway 2 and the inner raceway 4 that rotate freely, making it possible for the outer race 1 to rotate freely with respect to the inner race 3. These rolling elements 5 are held by a retainer 6 so that they are able to rotate freely.

The "outer race" and "inner race" are also referred to as "outer ring" and "inner ring", respectively. And, the "outer raceway" and "inner raceway" are also referred to as "outer ring raceway" and "inner ring raceway".

The rolling bearing, constructed as described above to form the rotation support section of the device such as an HDD or VTR, is filled with grease in the internal section where the rolling elements 5 are located between the outer raceway 2 and the inner raceway 4 in order to lubricate the rolling elements 5, the outer raceway 2 and inner raceway 4. Accordingly, for the rolling bearing, it is necessary to install a sealing device in order to prevent the grease from leaking out, and to separate the internal section of the rolling bearing from the outside. Accordingly, there is a shield groove 8 that is formed around the edge of the inner peripheral surface of the outer race 1.

Various kinds of such sealing devices have been known. FIGS. 21 and 22 show the sealing device that has generally been used and that has been disclosed in Japanese Utility Model First Publications KOKAI S54-68048, S58-112773, and H2-92117, and Japanese Patent First Publication KOKAI No. S62-167926.

In the case of this well known sealing device, a shield plate 7 (FIG. 22) is formed into an annular shape from sheet metal and its outer edge is caulked or crimped into the shield groove 8 as shown in FIG. 22. In other words, as shown in FIG. 21, a blank plate 9 of the sheet metal is formed beforehand with a bent section 10 on its outer peripheral edge, so that it has a smaller diameter. And this blank plate 9 is located on the inside of the shield groove 8, so that the bent section 10 is pressed against the stepped section 11 which partly defines the inside of the shield groove 8. As a result, the bent section 10 is deformed plastically in the radially outward direction, and as shown in FIG. 22, so as to be fitted into the shield groove 8. Accordingly, the diameter of the blank plate 9 is enlarged, so that the outer peripheral edge of the shield plate 7 becomes fixed in the shield groove 8.

FIG. 23 shows the sealing device that is described in Japanese Utility Model First Publication KOKAI No. S49-114350. In the case of the sealing device described in this disclosure, several attachment protrusions 13 are formed around the outer peripheral surface of the cylindrical section around the radially outer edge of the shield plate 7a. By fitting these attachment protrusions 13 to the edge or wall portion of the shield groove 8 which is formed around the end of the internal peripheral surface of the outer race 1, the shield plate 7a is supported by the inside of the outer race 1.

FIG. 24 shows the sealing device that is described in Japanese Utility Model Publication KOKOKU No. H5-16411. In the case of the sealing device described in this disclosure, the shield plate 7b is made of a sheet metal and a bent section 14 is formed on the radially outside edge of the shield plate 7b so that it bends toward the outside (the side opposite from where the rolling elements are located, or the right side in FIG. 24). By elastically fitting the bent section 14 into the shield groove 8, which is formed around the end of the inner surface of the outer race 1, the shield plate 7b is supported on the inside of the outer race 1.

Furthermore, FIG. 25 shows the sealing device that is described in U.S. Pat. No. 4,183,592. In the case of the sealing device disclosed in this patent, a tapered surface 15 that becomes smaller toward the opening end is formed on both ends of the inner peripheral surface of the outer race 1. As the outside edge of the shield plate 7c is elastically pressed toward this tapered surface, the shield plate 7c is supported on the inside of the outer race 1.

The prior art sealing devices for a rolling bearing described above have problems that should be solved, as described below.

First, in the case of the construction of the first example shown in FIGS. 21 and 22, not only does it increase the manufacturing cost, but it causes deformation of the outer race 1.

In other words, in order to support and fix the shield plate 7 on the inside of the outer race 1, it is necessary to perform a plastic deformation process (crimping) for the bent section 10. As a result the work of attaching the shield plate 7 becomes very troublesome, and together with requiring complicated equipment for performing the crimping work, it causes an increase in the cost of the rolling bearing with sealing device.

Moreover, as the aforementioned bent section 10 is plastically deformed, the bent section 10 strongly presses outward in the radial direction against the part of the outer race 1 where the shield groove 8 is formed. As a result, this part of the outer race 1 deforms elastically in the direction where the diameter becomes large. The amount of deformation caused by this elastic deformation is uneven around in the circumferential direction, causing unbalance in the outer race 1 or minute undulation in the surface of the outer raceway 2. Accordingly, if the outer race 1 or the inner race 3 of the rolling bearing rotates at high speed, it is easy for harmful vibrations to occur due to unbalanced rotation or due to the minute undulation in the surface of the outer raceway 2. Especially in recent years, as HDD devices are made more compact, the thickness of the outer race 1 becomes smaller, and problems due to elastic deformation as described above begin to be more common.

In the construction of the second and fourth examples shown in FIG. 23 and FIG. 25, the outer peripheral face of the cylindrical section 12 (second example) or the outer peripheral edge of the shield plate 7c (fourth example) strongly presses outward in the radial direction the part of the outer race 1 where the shield groove 8 or the tapered surface 15 is formed. Therefore, this part of the outer race 1 deforms elastically in the direction where the diameter becomes larger, making it easy for harmful vibrations to occur.

Furthermore, in the third example shown in FIG. 24, the elastic deformation of the outer race 1 is relatively small, however deformations as before still remain. As a result, the occurrence of defective products due to harmful vibrations increases to a level that cannot be ignored. In other words, in the construction of the third example, the bent section 14 elastically presses against the inside surface of the shield groove 8 all the way around the circumference. The elastic restoration force per unit length of the bent section 14 is small, however as it presses all the way around the inside surface of the shield groove 8, the overall force applied to the outer race 1 from the shield groove 8 is large enough that it cannot be ignored, and it causes the outer race 1 to be elastically deformed. It is impossible to avoid unevenness caused by the elastic restoration force of the bent section 14, and thus part of the outer race 1 deforms elastically in the direction where the diameter becomes large, making it easy for harmful vibrations to occur.

In Japanese Utility Model Publication KOKOKU No. H5-16411, which describes the construction shown in FIG. 24, by forming an a crown shaped or arc-shaped surface around the outer peripheral surface on the end of the outer race 1, the elastic deformation does not cause vibration even when the end of the outer race 1 is elastically deformed due to the elastic restoration force of the bent section 14. However, the work involved in manufacturing this arc-shaped surface is very troublesome, thus increases the cost for manufacturing the rolling bearing with sealing device. Moreover, it is thought that when the outer race 1 rotates at high speed, harmful vibrations occur due to the unevenness of the centrifugal moment caused by the elastic deformation.

In respect to this, it is thought that the outer peripheral edges of shield plates 7, 7a, 7b and 7c should not be pressed against the inside surface of the shield groove 8 of the outer race 1, and that the outer peripheral edges of these shield plates 7, 7a, 7b, and 7c, should be simply be attached to the shield groove 8 so that it does not come out. If the outer peripheral edge is not pressed against the inside surface of the shield groove 8, the outer race 1 is not elastically deformed, and thus it is possible to prevent the occurrence of vibrations caused by the elastic deformation.

However, with this kind of construction, since the shield plates 7, 7a, 7b and 7c may rotate relative to the outer race 1, and thus as the outer peripheral edge of the shield plates 7, 7a, 7b, and 7c comes in contact with the inside surface of the shield groove 8, it is easy for this area of contact to wear out. Wear of the area of contact causes vibration to occur due to the shakiness of the shield plates 7, 7a, 7b, and 7c, and it causes vibration to occur due to worn particles becoming attached to the rolling surface of the rolling elements 5, and therefore is not desirable.

SUMMARY OF THE INVENTION

An objective of this invention is to eliminate the problems of the sealing device for rolling bearing as mentioned above.

Another objective of this invention is to provide an improved sealing device which is installed on a rolling bearing having an outer race with an outer raceway located around the middle of its inner surface, an inner race with an inner raceway located around the middle of its outer surface, and several rolling elements provided so as to rotate freely in the space between the outer raceway and inner raceway, wherein the space formed for the rolling elements between the outer raceway and inner raceway is separated from the outside of the rolling bearing.

Another objective of this invention is to provide an improved sealing device for rolling bearing which comprises an shield groove formed generally circumferentially on an end portion of the inner peripheral surface of the outer race, and a shield plate which has its outer peripheral edge attached to this shield groove, and its inner peripheral edge provided near an end portion of the outer peripheral surface of the inner race. The shield groove is defined by a stepped section that has a relatively large step on the side of the outer raceway, and a protruding section that has a relatively small step on the side of the opening end of the outer race.

Also, another objective of the present invention is to provide a sealing device comprising a shield plate which is shaped into a circular ring by cutting several notches around the outer edge portion of sheet metal and bending or folding the edge portions located between the adjacent notches in the same front-back direction with reference to the sheet metal, thus forming elastically deformable bent sections that are arrayed in the circular direction, such that the height in front-back direction of part of the bent sections of the shield plate is larger when compared with the remaining part for suitable fitting in the outer race.

DETAILED DESCRIPTION OF THE PREFERRED EMBODIMENTS

Figure 1:
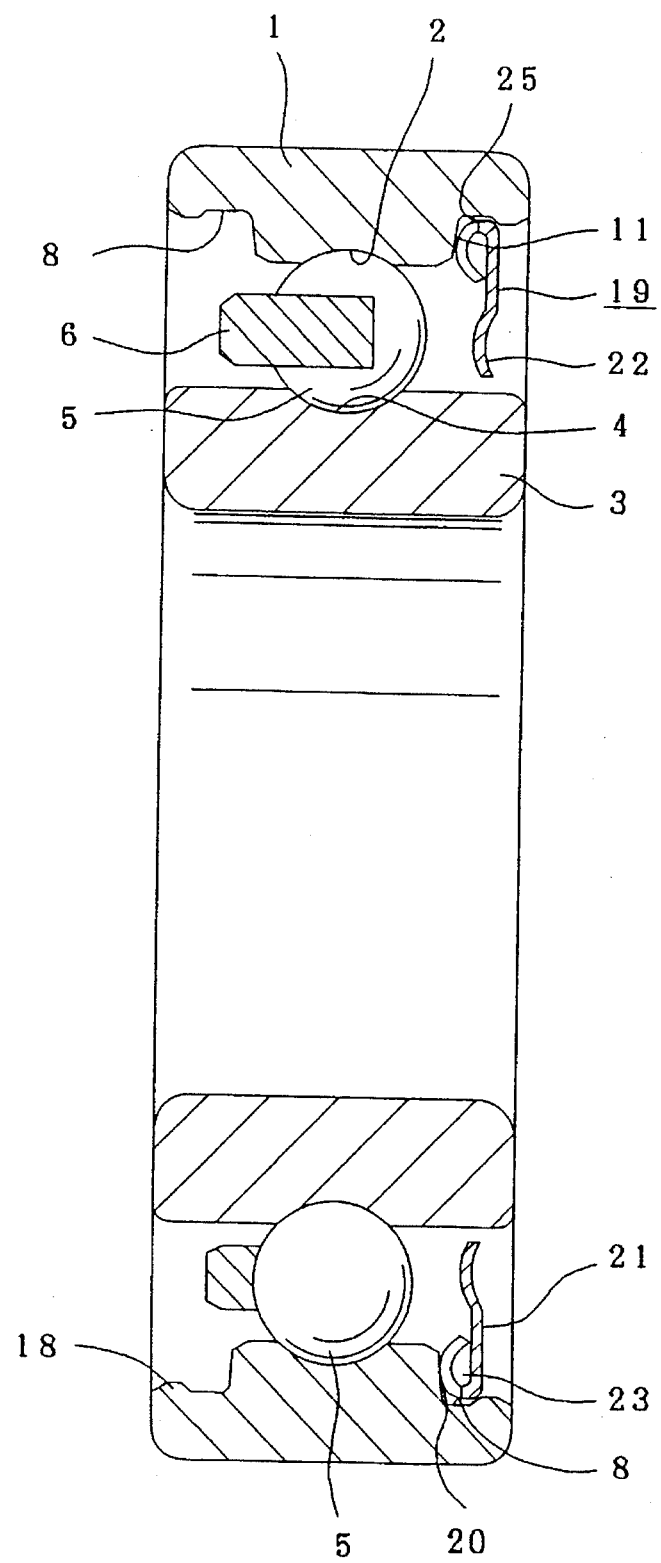
FIG. 1 is a partial cross-sectional drawing showing a first embodiment of this invention.

A first embodiment of this invention is shown in FIGS. 1 thru 4. The basic construction of the rolling bearing with sealing device, and the actual function of the sealing device to prevent grease leakage is substantially the same as in the prior construction, and therefore redundant explanation will be omitted. Below, the part of the sealing device that is an object of this invention will be described.

The rolling bearing comprises an outer race 1 and inner race 3 and a plurality of balls 2 between the central portions of the outer and inner races.

On each side of the central portion of the outer race 1, a stepped section 11 is formed, while on each end of the outer race 1 is formed a protruding section 18.

Figure 6:
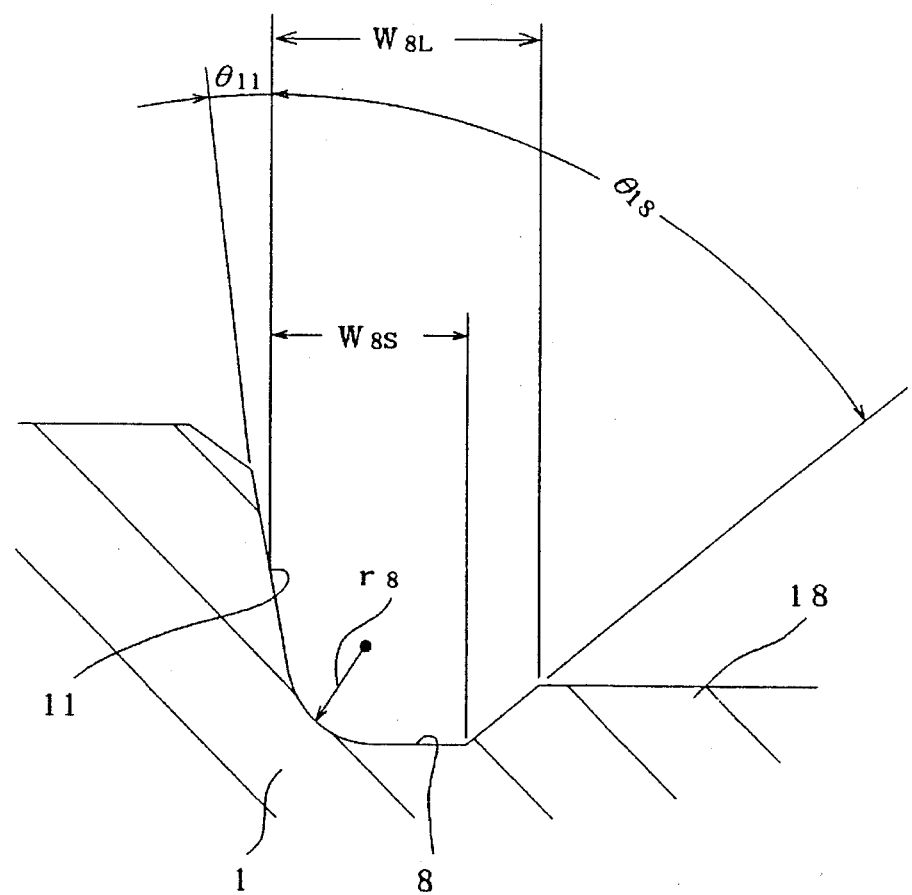
FIG. 6 is an enlarged view of section VI of FIG. 5.

A shield groove 8 is formed all the way around the end of the inner peripheral surface of the outer race 1. This shield groove 8, as shown in detail in FIG. 6, is defined by the stepped section 11 on the side of the outer raceway 2 (left side in FIG. 6), and the protruding section 18 on the side of the opening end of the outer race 1 (right side in FIG. 6). The stepped portion 11 has a relatively large step while the protruding section 18 has a relatively small step.

A shield plate 19 is provided to separate the portion of the rolling bearing where the several rolling elements 5 are located between the outer raceway 2 and inner raceway 4. The shield plate 19 is made of sheet metal such as stainless steel or carbon steel, and is formed into a circular ring shape as shown in detail in FIG. 3. The outer half in the radial direction of the shield plate 19 is made into a flat section 21. The outside surface (right side in FIG. 3) of this flat section 21 is made in a wide surface area so that it comes in contact with the insertion jig (not shown) which will be described later.

The inner half in the radial direction of the shield plate 19 is formed into a curved section 22 whose cross-section is arc shaped. This portion of the shield plate can be made flat instead of the curved section 22. However by creating the curved section 22, the cross-section coefficient becomes larger making it more difficult for the shield plate 19 to deform.

Furthermore, the outer peripheral edge portion of the flat section 21 is bent or folded to form a plurality of bulging bent sections 20 in a hollow shape that can freely deform elastically. All of these bent sections 20 are formed by bending back the outer peripheral portion of the sheet metal that makes up the shield plate 19, so that when it deforms elastically, the dimension in the direction of its thickness (left and right in FIG. 3) is freely compressed.

Figure 4:
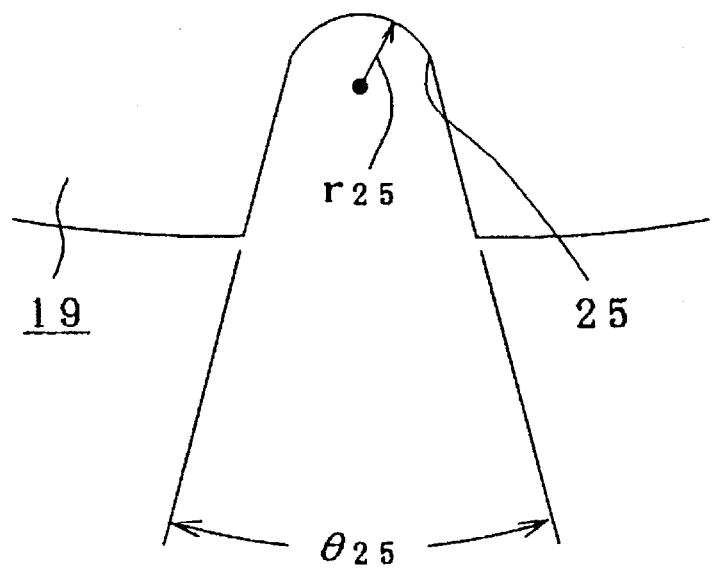
FIG. 4 is a view of the shield plate of FIG. 3 as seen from the side, and shows a notch that is formed around the edge of the sheet metal that makes up the shield plate.

In other words, the shield plate 19 is constructed by forming several V-shaped notches 25 all the way around the outer peripheral edge portion of the ring-shaped sheet metal as shown in FIG. 4, and by bending in the same front-back direction the edge portions located between adjacent notches 25 to form the bulging bent sections 20 (there are nine bent sections in this embodiment) that can freely deform elastically.

There is a gap 23 between each tip portion 30 of the bulging bent sections 20 and the flat section 21.

Figure 2:
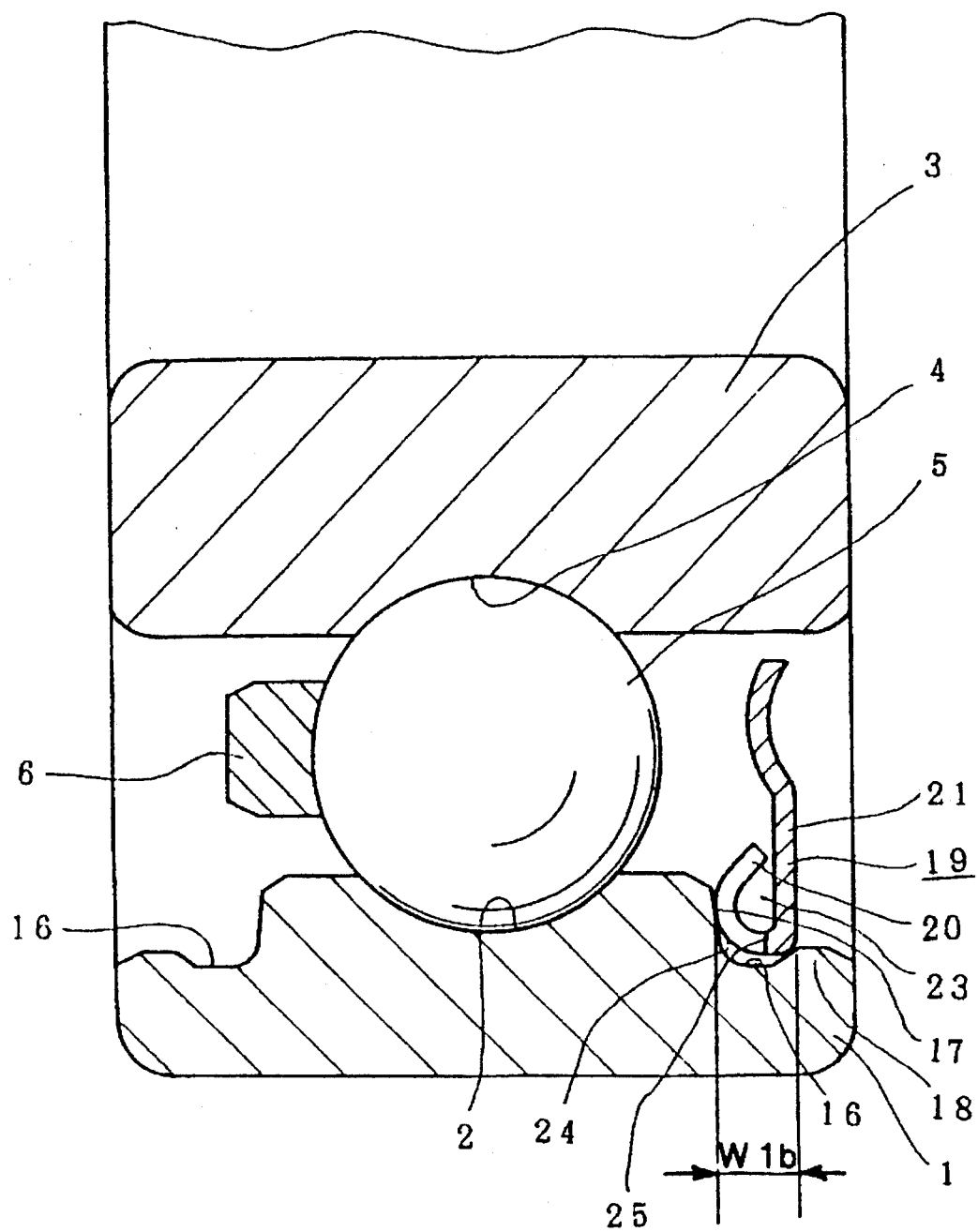
FIG. 2 is an enlarged drawing showing the bottom portion of FIG. 1.
Figure 3:
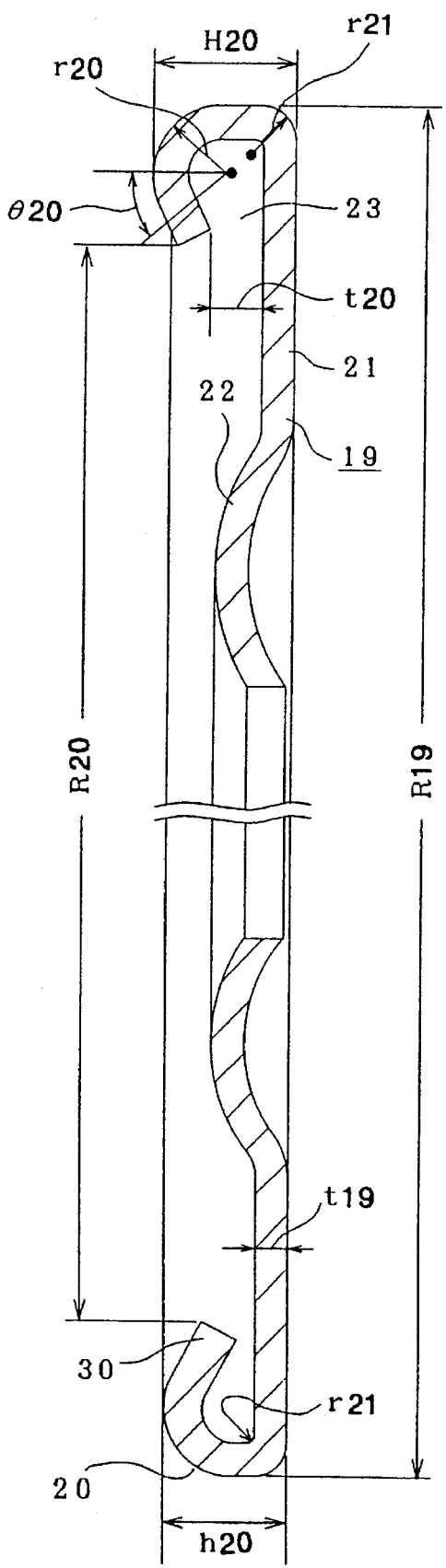
FIG. 3 is a partly cut-away, cross-sectional drawing of the shield plate.

The depth of the notch 25 shown in FIG. 4 looks smaller than the actual size. The actual notches 25, as shown in FIGS. 1 and 2, have a depth that reaches the base of the bent sections 20.

The height H20, h20 (see FIG. 3) of the bent sections 20 in the thickness direction or front-back direction of the shield plate 19 which makes up the sealing device for rolling bearing of this invention is large in part (H20) when compared in the remaining part (h20) in the circumferential direction. In other words, it is desirable if the height H20 of only one of the bent sections 20 is a little larger than the width w8 of the shield groove 8 (see FIG. 2) (H20>w8), and if the height h20 of the remaining bent sections 20, is the same or a little smaller than this width w8 (h20≦w8).

In order to form these bent sections 20 so that they have differing heights, first, all of the bent sections 20 are formed so that the height H20 is a little larger than the width w8 of the shield groove 8. Then all of the bent sections 20 except for the one (H20) mentioned above, are pressed and squeezed in the direction of thickness of the shield plate 19, so that the height of these remaining bent sections is compressed to the height h20.

When constructing the sealing device for rolling bearing of this invention, the shield plate 19, constructed as described above, is attached to the shield groove 8 which is shaped as described above and formed around the end on the inner peripheral surface of the outer race 1. When doing this, the shield plate 19 should be installed on the inside of the outer race 1 so that the bent sections 20 are faced toward the inside (side of the rolling elements 5). After the shield plate 19 has been installed, the bent sections 20 should come in contact with the stepped section 11 when the outer peripheral edge of the shield plate 19 has been attached to the shield groove 8.

In the case of the sealing device for rolling bearing of this invention, constructed as described above, there is hardly any elastic deformation of the outer race 1 even when the shield plate 19 has been attached. In other words, the shield plate 19 is attached on the inside of the outer race 1 by fitting the bent sections 20 around its outer peripheral edge into the shield groove 8 that is formed around the end of the inner peripheral surface of the outer race 1, so that it does not come out from the inside of the outer race 1. With the shield plate 19 attached on the inside of the outer race 1, there is a small clearance 24 (FIG. 2) that exists between the outer peripheral surface of the bent sections 20 and the bottom of the shield groove 8. Accordingly, the bent sections 20 hardly press to enlarge the outer diameter of the outer race 1.

Accordingly, in the case of the sealing device for rolling bearing of this invention, only a part of the bent sections 20 (for example one out of nine) formed on the outer peripheral edge of the shield plate 19, stick out in the axial direction (left and right in FIGS. 1 thru 3) to prop up the stepped section 11 and the protruding section 18 which define the shield groove 8. Therefore, the total propping force in the axial direction becomes small. In a part of the outer race 1 which is propped by the bent section 20 with the relatively large height H20, a force is applied to the outer race 1 that causes elastic deformation in the direction where the width w8 of the shield groove 8 becomes large. However, this force is dispersed not only to this part but to the remaining part as well. Therefore, the elastic deformation of the outer race 1 becomes small, and it is hard for deformation to occur that will cause vibration.

Moreover, if the elasticity of the bent section 20 with the relatively large height H20 and the width w8 of the shield groove 8 are proper, there is a sufficient amount of friction that occurs between this bent section 20 and the shield groove 8. Accordingly, the shield plate 19 does not rotate relative to the outer race 1. It is desirable if the ratio of the circumferential length of the bent section 20 with the relatively large height H20 is less than ¼ the total circumference, and it is even better if it is less than ⅙ the total circumference (it is ⅑ in this embodiment). The ratio should be made as small as possible so long as it is able to prevent the shield plate 19 from rotating relative to the outer race 1.

Furthermore, in the embodiment shown in the figures, when pressing the bent sections 20 into the attachment groove 8, in order that the shield plate 19 is installed inside the outer race 1, an insertion jig, whose pressure surface is flat, comes in contact with the flat section 21, and is used to insert the shield plate 19 inside the outer race 1. When performing this insertion work, the bent sections 20 become elastically deformed, and fit into the shield groove 8. When inserting the shield plate 19, the pressure surface of the jig contacts the flat section 21 of the shield plate 19 over a wide area. Accordingly, there is not plastic deformation of any part of the shield plate 19 due to this installation work. Since the outer race 1 is not deformed elastically in either the radial or axial direction, and also since there is no plastic deformation of the shield plate 19, no harmful vibrations occur due to rotation unbalance when the rolling bearing rotates at high speed, or due to twisting of the outer raceway 2.

With the sealing device for rolling bearing of this invention, constructed as described above, when the outer peripheral edge portion of the shield plate 19 is attached to the shield groove 8 with the bent sections 20 in contact with the stepped section 11, only part of the bent sections 20 in the circumferential direction functions as a positive prop between the stepped section 11 and the protruding section 18, and the remaining bent sections do not strongly prop up the stepped section 11 and the protruding section 18. Accordingly, there is very little if any elastic deformation of the outer race 1 even with the shield plate 19 attached. In other words, since only part of the bent sections 20 formed around the outer peripheral edge portion of the shield plate 19 props up the stepped section 11 and the protruding section 18 which define the shield groove 8, the total protrusion force becomes small.

In the part of the outer race 1 which is propped by part of the bent sections 20, a force is applied in the direction that causes elastic deformation of the outer race 1, however this force is dispersed not only to this part but to the remaining parts as well. In addition, in the present invention, the insertion jig desirably has a press-force adjusting means such as a constant pressure spring, adjustable hydraulic pressure device.

Therefore, elastic deformation of the outer race 1 becomes very small, and it is not enough to cause vibration to occur.

Moreover, rotation of the shield plate 19 relative to the outer race 1 can be prevented by the bent section 20 that sticks out between the stepped section 11 and the protruding section 18. Also, even if the remaining bent sections 20 do not rub strongly against the stepped section 11 and protruding section 18, it is possible to prevent the shield plate 19 from rotating relative to the outer race 1, and it is possible to prevent the outer edge of the shield plate 19 from coming in contact with the shield groove 8 and wearing out.

Also, since it is not necessary to perform crimping work to attach the shield plate 19, it is possible to reduce the manufacturing cost of the rolling bearing with sealing device.

In the embodiment shown in the figures, the shield plate 19 is attached to only one side of the outer race 1 (right side in FIG. 1), however if necessary it is possible to attach a shield plate 19 to both sides of the outer race 1.

Next, tests that were performed in order to confirm the effect of the invention will be explained. The conditions of the tests are given below. Some conditions are provided with ranges because these conditions are also regulated by manufacturing errors etc. However, even if the conditions vary within the specified range, any effects of this variation on the test results can be ignored.

Figure 5:
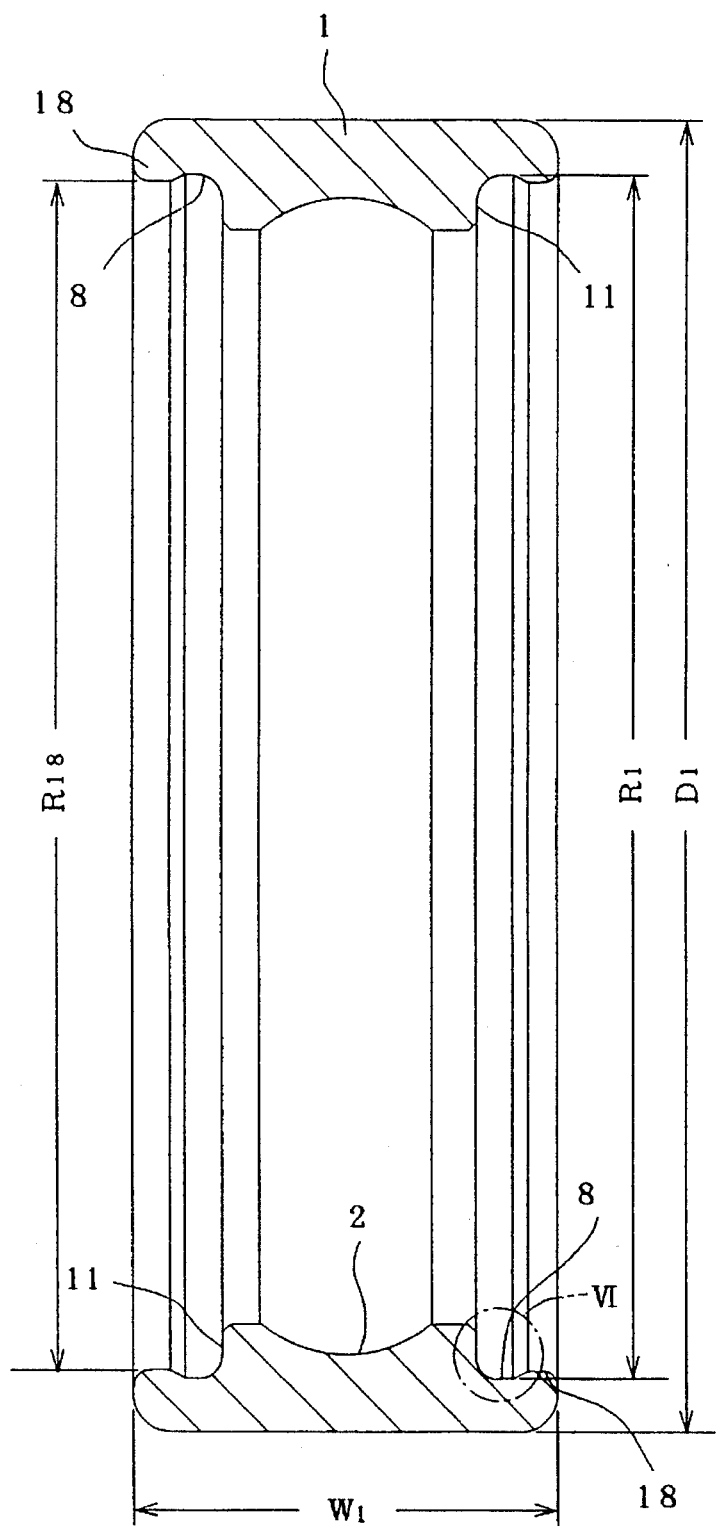
FIG. 5 is a cross-sectional drawing of the outer race in which the shield plate is installed.

Conditions for the Outer Race 1 (see FIG. 5)
   Material: High-carbon chromium bearing steel SUJ 2 (JIS G 4805)
   Outer diameter D1: 8.0 mm
   Bottom diameter R1 of the shield groove 8: 7.3 mm
   Width W1: 2.6 mm
   Inner diameter R18 of the protruding section 18: 7.18 mm Conditions of the Attachment Groove 8 (see FIG. 6)
   Angle of incline $\theta_{11}$ of the stepped section 11: 7 degrees
   Angle of incline $\theta_{18}$ of the inside surface of the protruding section 18: 55 degrees
   Width W8S of the shield groove 8 measured from a point in the middle in the radial direction of the stepped section 11 to the base of the inner surface of the protruding section 18: 0.22 mm
   Width W8L of the shield groove 8 measured from a point in the middle in the radial direction of the stepped section 11 and the tip of the inner surface of the protruding section 18: 0.305 mm
   Radius of curvature r8 of the arc portion that is continuous from the bottom of the shield groove 8 to the stepped section 11: 0.1 mm Conditions of the Shield Plate 19 (see FIGS. 3 and 4)
   Material: Stainless steel SUS 304 (JIS G 4303)
   Thickness t19: 0.08 mm
   Outer diameter R19: 7.235 mm
   Number of bent sections 20: 9
   Radius of curvature r20 of the outer peripheral surface of the bent sections 20: (2 to 2.5) t19=0.16 to 0.20 mm
   Height H20 of part of the bent sections 20: 0.37 mm
   Height h20 of the remaining bent sections 20: 0.305 mm (=W8L)
   Radius of curvature r21 of the outer peripheral surface running from the flat section 21 to the bent sections 20 (r21≦t19): 0.08 mm
   Angle $\theta 20$ of the tip of the bent sections 20 with respect to the flat section 21: 30 to 40 degrees
   Radius R20 of the inscribed circle of the bent sections 20: 6.47 mm Thickness t20 of the clearance between the tip of the bent sections 20 and the flat section 21 (t20=(0 to 3) t19): 0 to 0.24 mm Angle θ25 between the side edges of notches 25: 30 degrees Radius of curvature r25 of the inside end of the notches 25: 0.15 mm In the test, seven types of shield plates 19 that met the above conditions were used with 25 shield plates 19 being made for each type (total 175 shield plates). After each shield plate 19 was attached to the shield groove 16, the out-of-roundness of the outer race 1 was measured for checking the elastic deformation of each of the shield plates 19.

Figure 7:
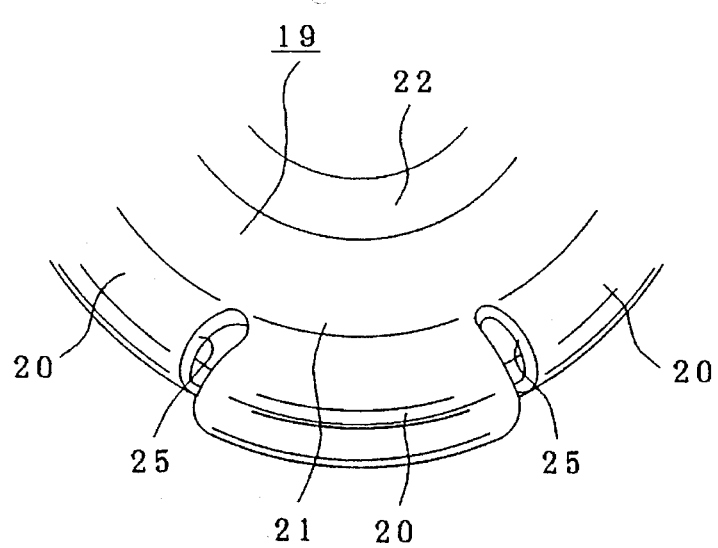
FIG. 7 is a perspective, partial view showing a first example of the shield plate used in a test for confirming the effect of the invention.

First, as shown in FIG. 7, twenty five shield plates 19 were prepared so that only one bent section 20 had a larger height H20, and the remaining eight bent sections 20 had a smaller height h20. Also, after these 25 shield plates 19 were attached to the shield groove 8 of the outer race 1, the outer race 1 was measured for out-of-roundness using the diameter process.

What is meant by the term "out of roundness using the diameter process" is the difference between the maximum outer diameter (μm) and the minimum outer diameter (μm) in the same radial plane.

Figure 8:
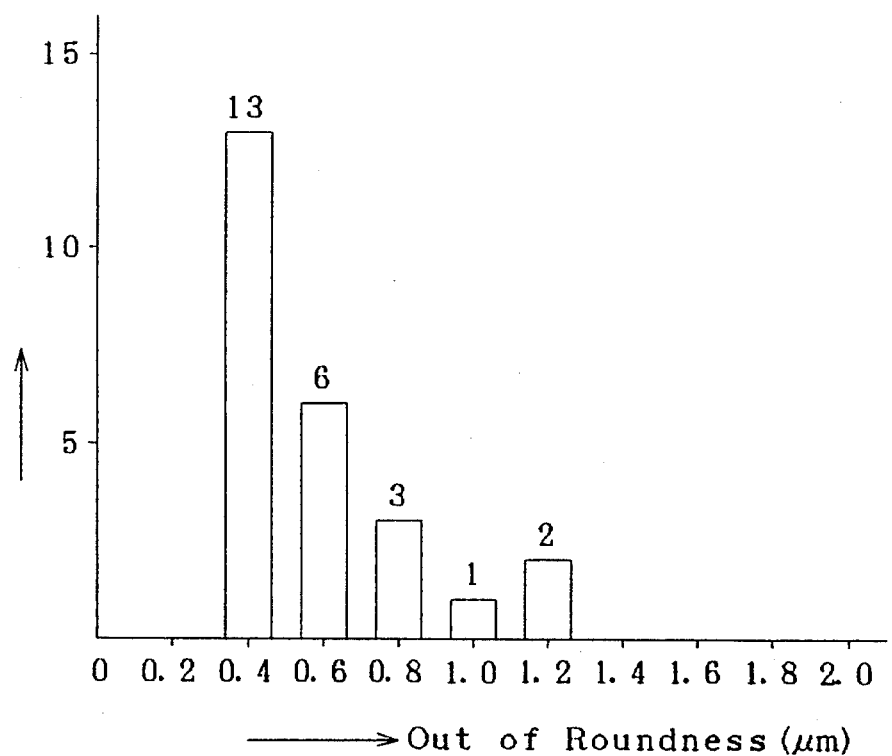
FIG. 8 is a bar graph showing the test results when using the shield plate of the first example.

The results are shown in FIG. 8. In FIG. 8, the out-of-roundness value is displayed along the abscissa and the number of test specimens that met a certain out-of-roundness is shown on the ordinate.

This is the same for figures, 8, 10, 12, 14, 16, 17 and 18 mentioned in this specification.

Figure 9:
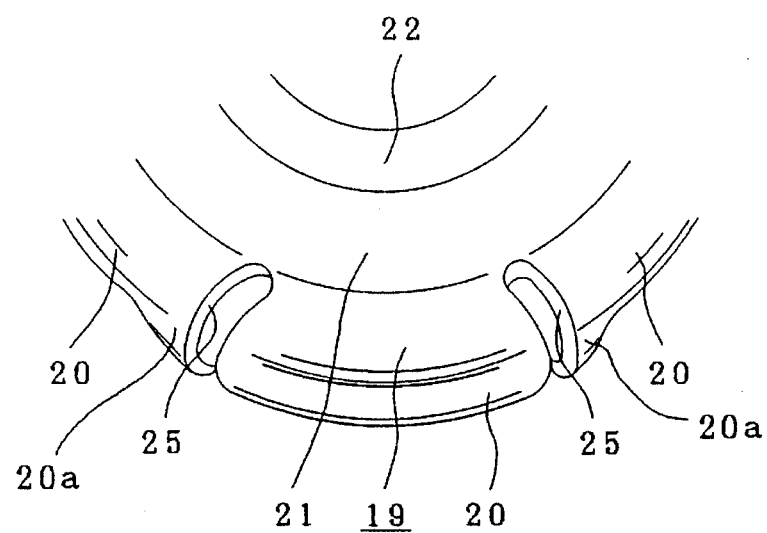
FIG. 9 is a perspective, partial view showing a second example of the shield plate used in the same test.
Figure 10:
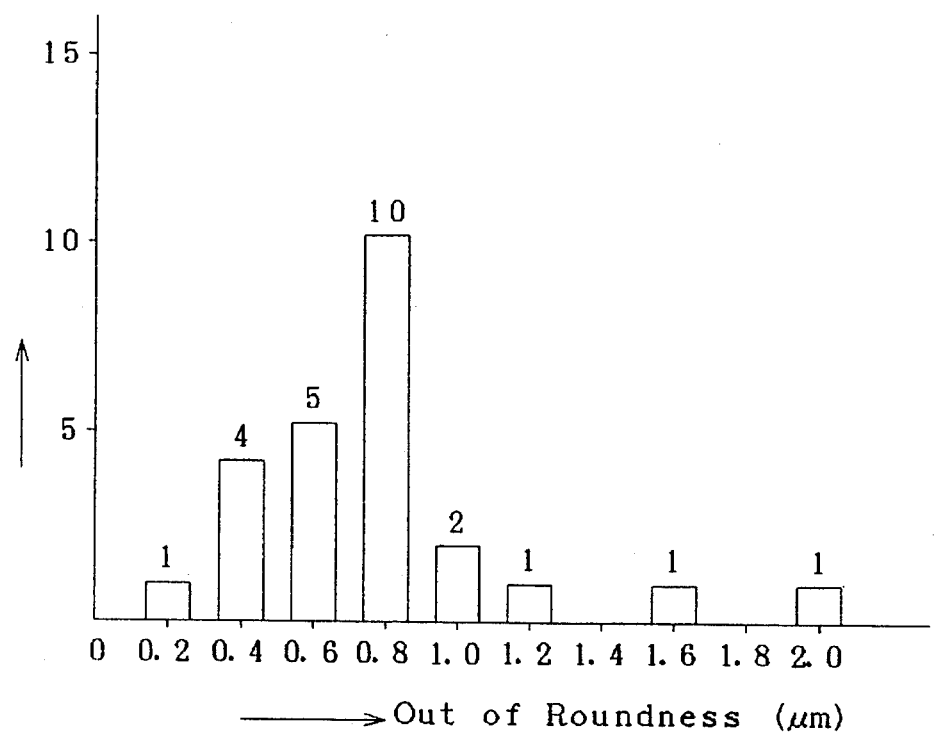
FIG. 10 is a bar graph showing the test results when using the shield plate of the second example.

Next, as shown in FIG. 9, twenty five shield plates 19 were prepared so that one bent section 20 and the one ends 20a of the two bent sections 20 adjacent to it have a larger height H20, and the other portions of the two bent sections 20 and the remaining bent sections 20 have a smaller height h20. Also, after these twenty five shield plates 19 were attached to the shield groove 8 of the outer race 1, the outer race 1 was measured for out-of-roundness using the diameter process. The results are shown in FIG. 10.

Figure 11:
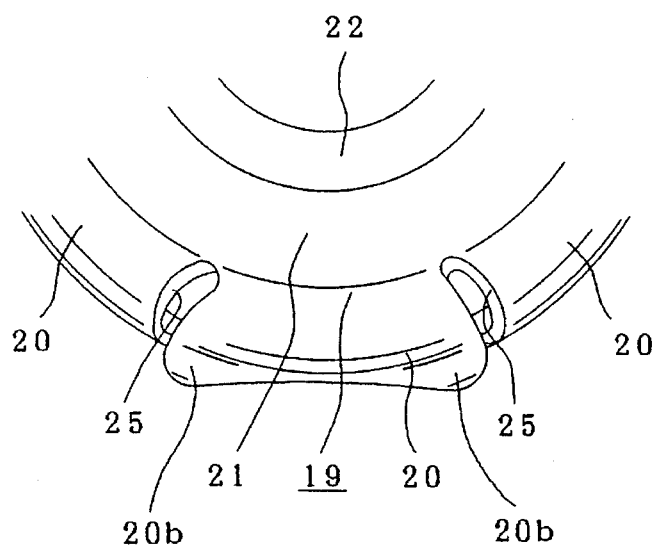
FIG. 11 is a perspective, partial view showing a third example of the shield plate used in the same test.
Figure 12:
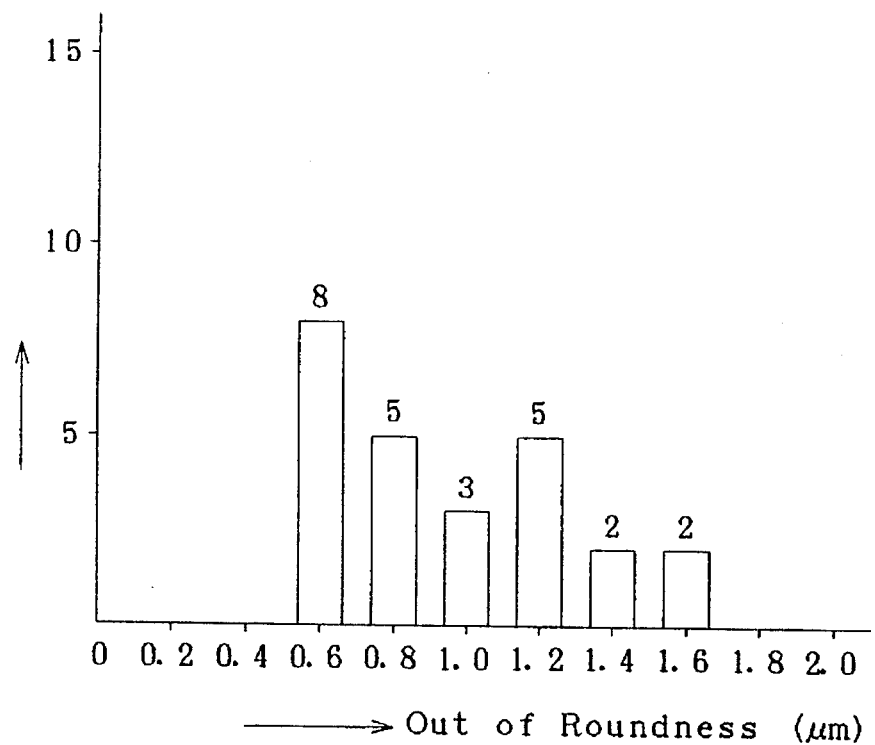
FIG. 12 is a bar graph showing the test results when using the shield plate of the third example.

Next, as shown in FIG. 11, twenty five shield plates 19 were prepared so that the outer surface of one of the bent sections 20 was curved in a concave shape and only both circumferential ends 20b of that bent section 20 were made to have larger height H20, and the remaining eight bent sections 20 have a smaller height h20. After these twenty five shield plates 19 were attached to the shield groove 16 of the outer race 1, the out-of-roundness of the outer race 1 was measured using the diameter process. The results are shown in FIG. 12.

Figure 13:
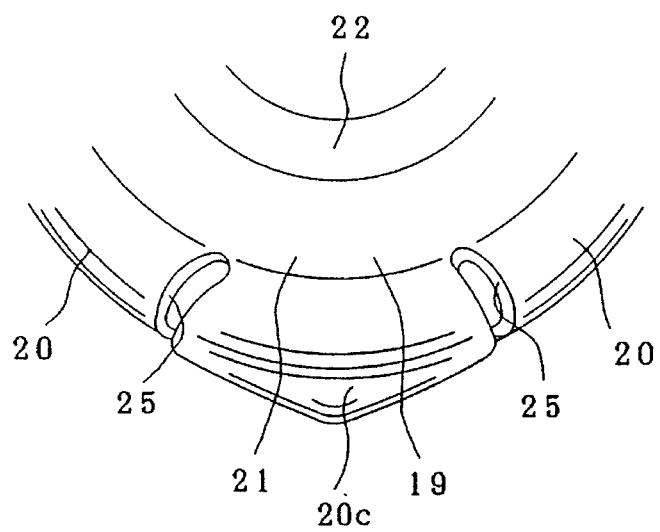
FIG. 13 is a perspective partial view showing the fourth example of the shield plate used in the same test.
Figure 14:
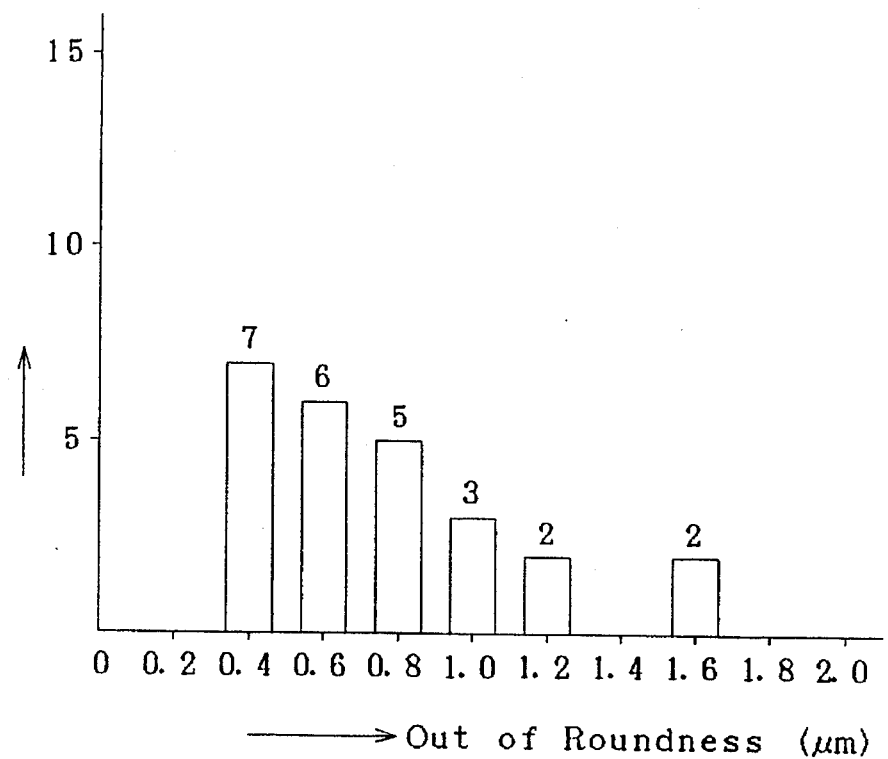
FIG. 14 is a bar graph showing the test results when using the shield plate of the fourth example.

Next, as shown in FIG. 13, twenty five shield plates 19 were prepared so that the outer surface of one of the bent sections 20 was curved in a convex shape and only the circumferential middle part of that bent section 20 had a larger height H20, while the remaining eight bent sections 20 had a smaller height h20. After these twenty five shield plates 19 were attached to the shield groove 8 of the outer race 1, the out-of-roundness of the outer race 1 was measured using the diameter process. The results are shown in FIG. 14.

Figure 15:
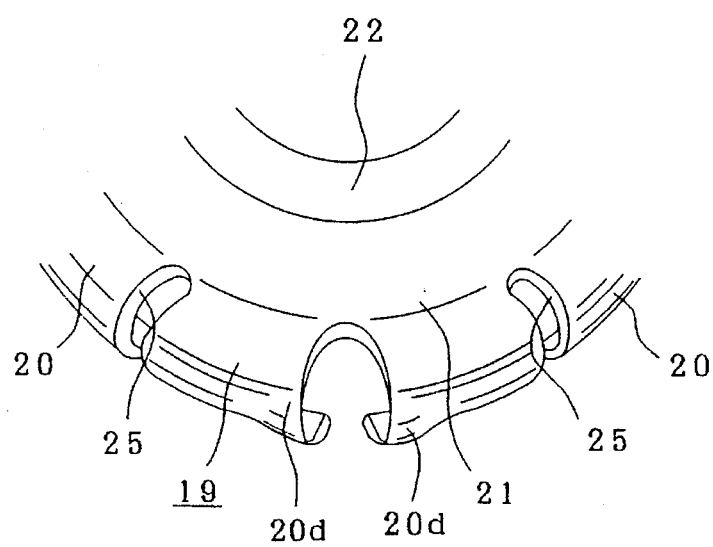
FIG. 15 is a perspective, partial view showing a fifth example of the shield plate used in the same test.
Figure 16:
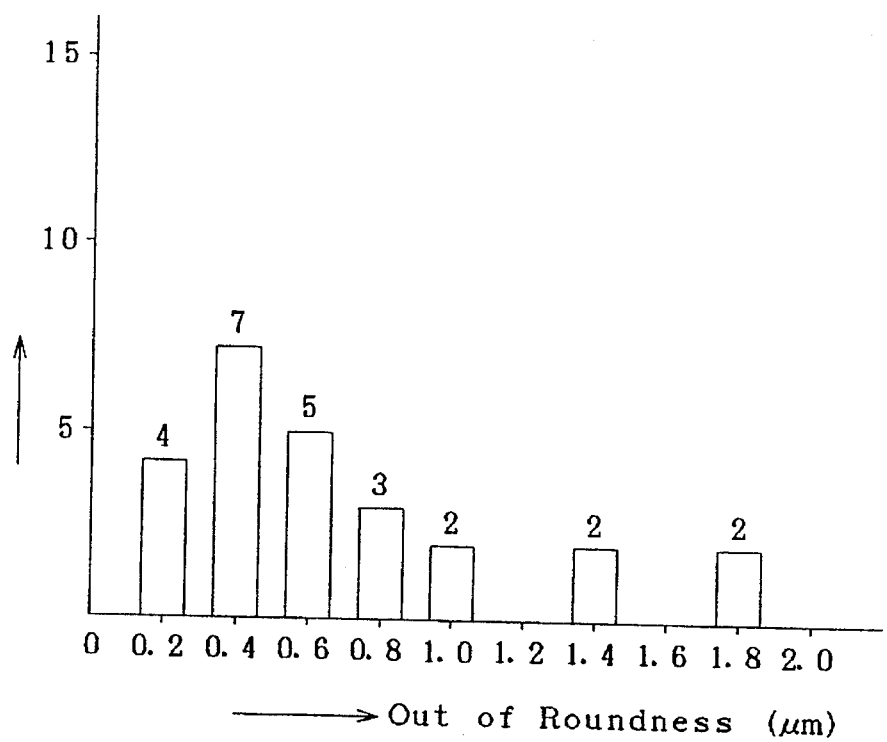
FIG. 16 is a bar graph showing the test results when using the shield plate of the fourth example.

Next, as shown in FIG. 15, twenty five shield plates 19 were prepared so that only the adjacent ends 20d of two circumferentially adjacent bent sections 20 had a larger height H20, while the remaining seven bent sections 20 had a smaller height h20. After these twenty five shield plates 19 were attached to the shield groove 8 of the outer race 1, the out-of-roundness of the outer race was measured using the diameter process. The results are shown in FIG. 16.

Figure 21:
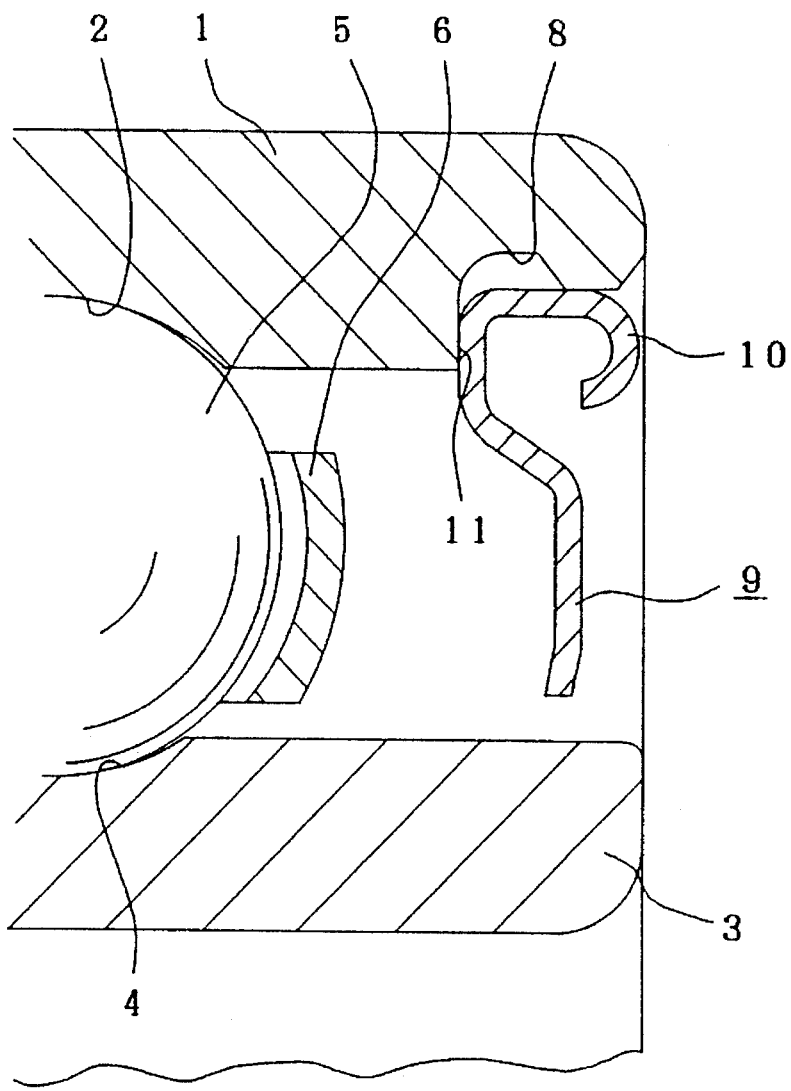
FIG. 21 is a cross-sectional, partial view of the construction of a first example of a conventional sealing device and shows the state of the shield plate before crimping.
Figure 22:
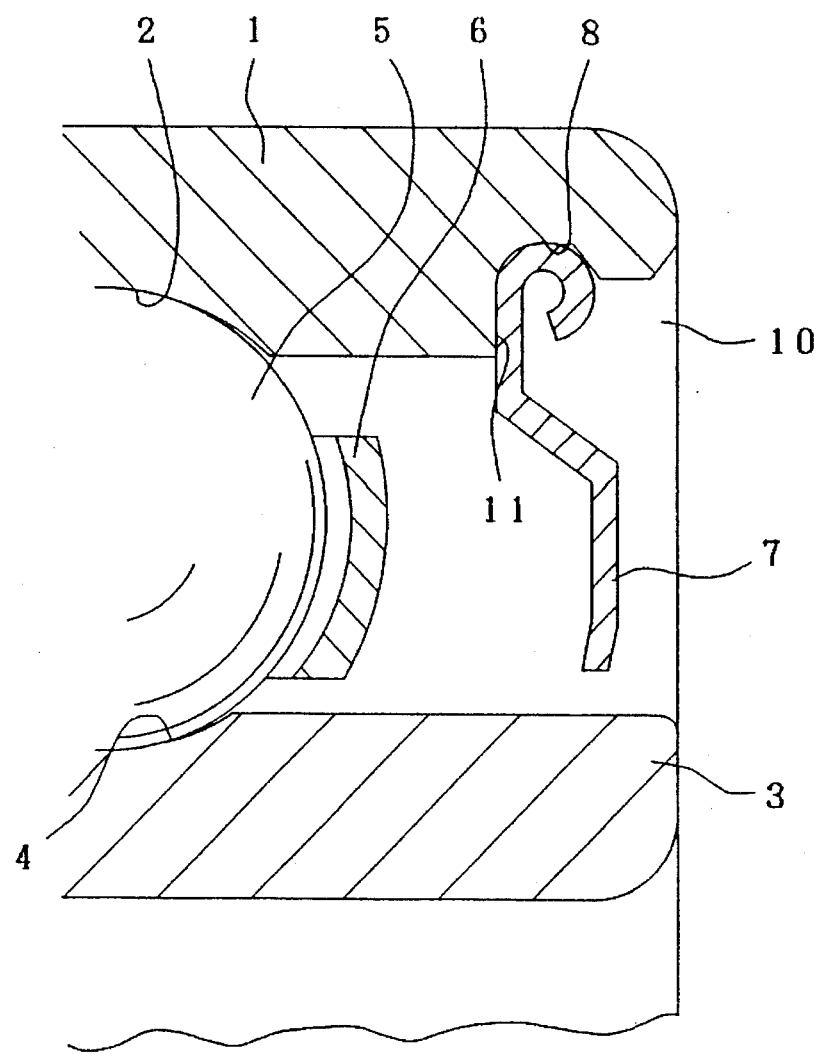
FIG. 22 is a cross-sectional partial view showing the state of the shield plate after crimping.
Figure 23:
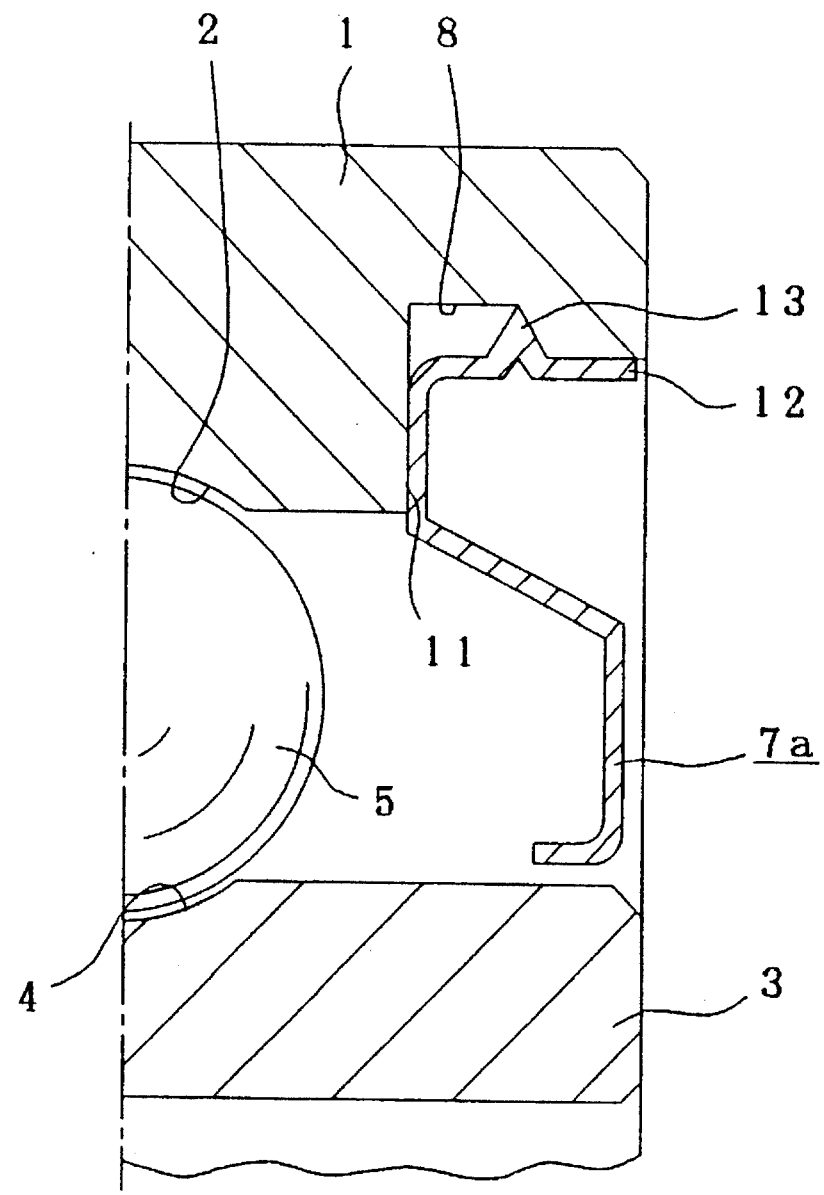
FIG. 23 is a cross-sectional, partial view showing a second example of a conventional sealing device.

Next, twenty five shield plates 7 of the crimping type as shown in FIGS. 21 and 22 (the size of the outer race and the thickness of the shield plate are according to the conditions described previously) were prepared, and after these shield plates 19 were attached to the outer race 1, the out-of-roundness of the outer race 1 was measured. The results are shown in 17.

Figure 18:
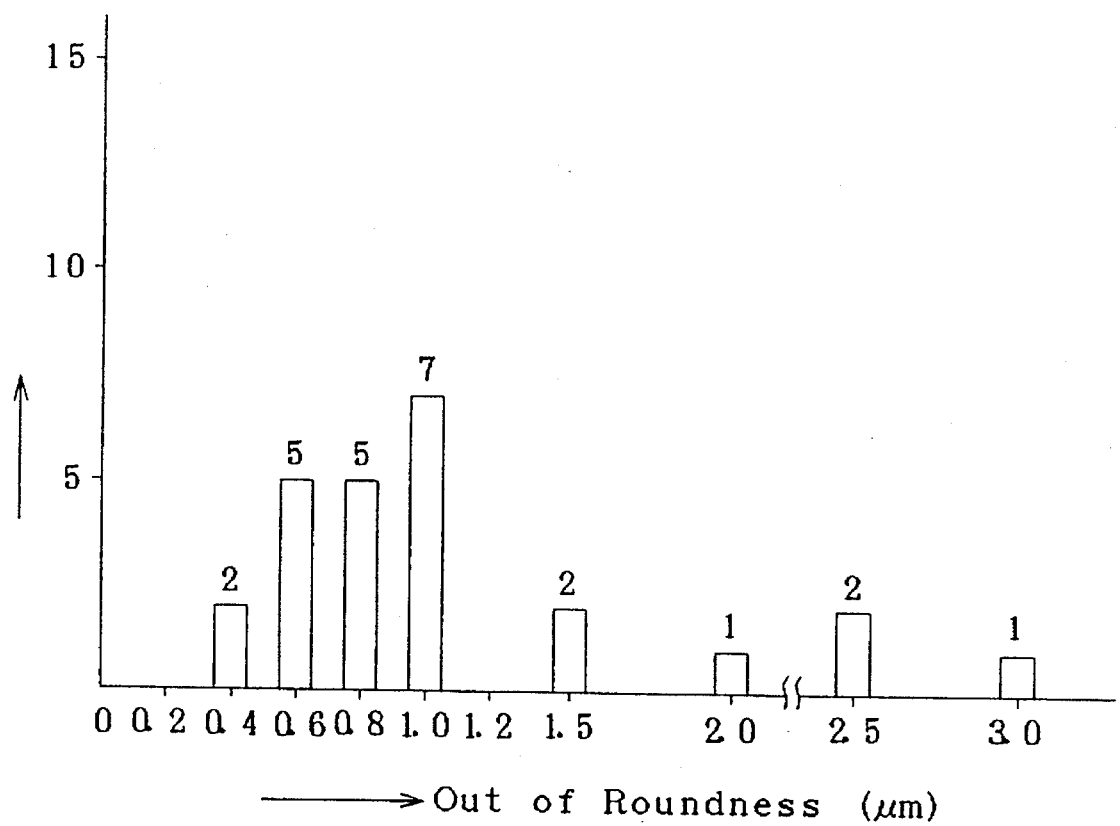
FIG. 18 is a bar graph showing the test results when using a shield plate that is attached by the elastic deformation of the bent sections all the way around the shield plate.

Furthermore, twenty five shield plates 19 were prepared so that the shield plates 19 are attached to the shield groove 8 of the outer race 1 by the elasticity of the nine bent sections 20, as shown in FIGS. 1 and 2, except that the height H20 (0.370 mm) of all of the bent sections 20 was larger than the width w8 (0.305 mm) of the shield groove 8. After these shield plates 19 were attached to the shield groove 8 of the outer race 1, the out-of-roundness of the outer race 1 was measured using the diameter process. The results are shown in FIG. 18.

As can be clearly seen from comparing all of the test results shown in FIGS. 8, 10, 12, 14, 16, 17 and 18, the sealing device for rolling bearing of this invention greatly reduces the amount that the out-of-roundness of the outer race 1 is deteriorated. Generally, in the case of the miniature bearing of an HDD, it is desired that the out-of-roundness of the outer race be 1.5 μm or less. Products (rolling bearings with shield plate) whose out-of-roundness, specifically of its outer race, exceeds 1.5 μm are determined to be bad and must be discarded, and as the number of products whose out-of-roundness exceeds 1.5 μm increases, the yield of the products becomes worse, thus pushing up the cost of part.

In the examples of the present invention shown in FIGS. 7 thru 16, the out-of-roundness of the race does not exceed 1.5 μm (FIGS. 7 thru 8, and FIGS. 11 and 12), or if it does it is extremely small (FIGS. 9 and 10, FIGS. 13 and 14, and FIGS. 15 and 16), therefore the yield is high, making it possible to lower the cost of the part. Especially in the case of the example shown in FIG. 7, a shield plate 19 is used where the height H20 of only one bent section 20 is made large, while the height h20 of the remaining eight bent sections 20 is smaller, and the out-of-roundness of the outer race is extremely good with very little variation. Also, with the shape of the example shown in FIG. 7, out-of roundness does not need to be measured for each part, thus it is possible to reduce the manufacturing cost.

Figure 17:
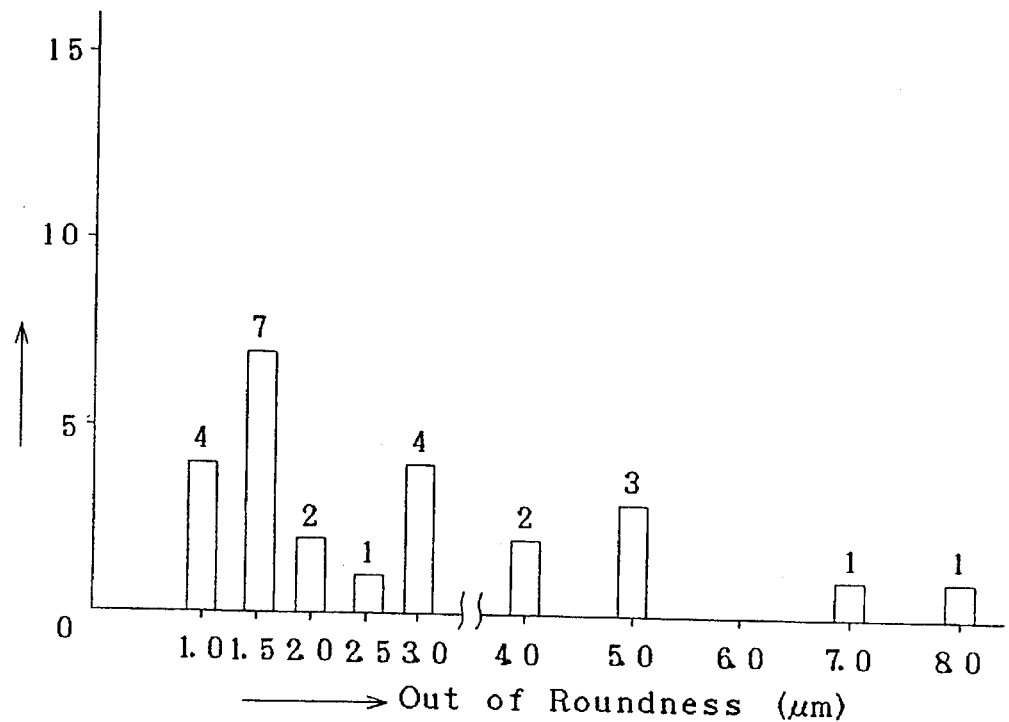
FIG. 17 is a bar graph showing the test results when using a conventional crimping-type shield plate.

In the case of using a ball bearing which uses a crimping-type shield plate as shown in FIGS. 21 and 22, not only does the absolute value of the out-of-roundness increase as shown by the test results in FIG. 17, but variation also increases.

On the other hand, in the case of using a ball bearing which uses a shield plate whose nine bent sections 20 all have a height that is larger than the width of the shield groove 8, it is possible to maintain the yield to a certain extent, as shown in the test results of FIG. 18, however the number of bad parts is substantially the same as before, and this must be solved.

Figure 19:
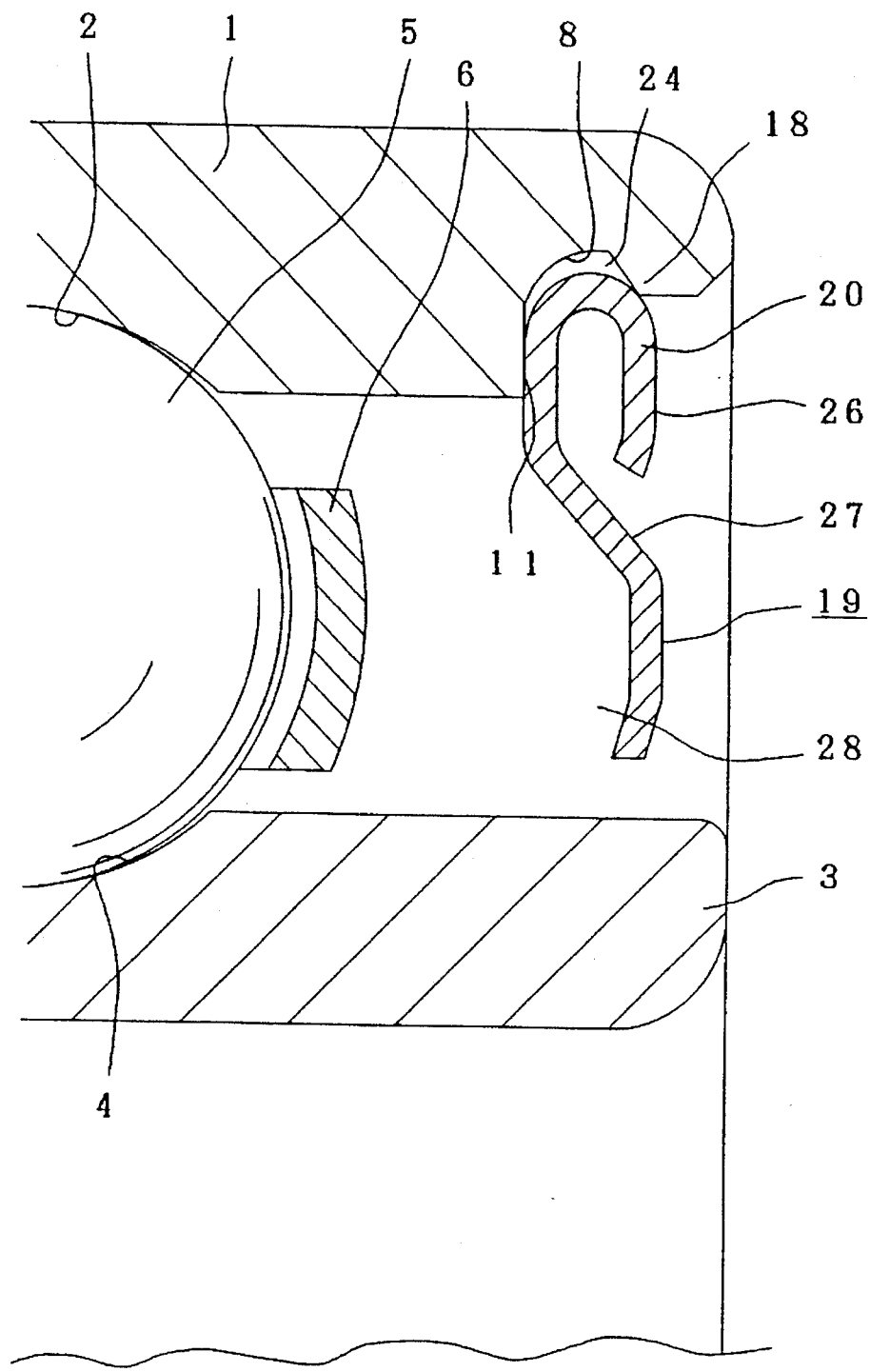
FIG. 19 is an enlarged, cross-sectional partial view of a second embodiment of the invention.
Figure 20:
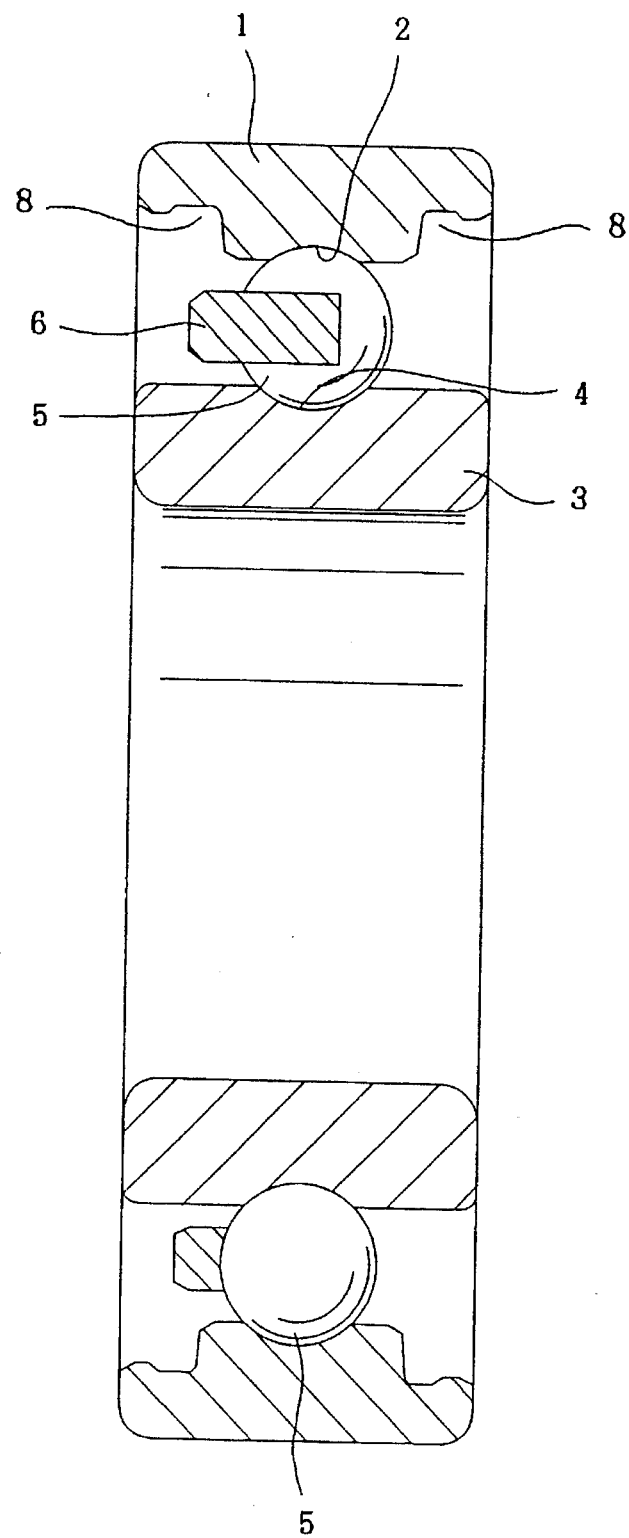
FIG. 20 is a cross-sectional view showing a first example of the rolling bearing.

Next, FIG. 19 shows a second embodiment of this invention in which a different example of a shield plate is used. As in the first embodiment described above, a shield groove 8 like the one used in the first embodiment is formed on both ends all the way around the inner surface of the outer race 1. However, the shield plate 19 used in this embodiment, is made out of sheet metal such as stainless steel or carbon steel and formed into a circular ring shape. Several evenly spaced notches 25 are formed all the way around the outer peripheral edge of the shield plate 19 (see FIGS. 1 thru 4), and the sections located between pairs of adjacent notches 25 are bent in a same direction to form bent sections 20 that can freely deform elastically in a hollow shape.

In this embodiment of the invention, the bent sections 20 are formed by bending back 180 degrees the outer peripheral edge of the sheet metal that makes up the shield plate 19, so that it forms a U-shaped cross section. These bent sections 20 can be compressed freely in the direction of thickness (left and right in FIG. 19) by elastically deforming. Also, in the embodiment shown in the figure, the tip of each of the bent sections 20 and the surface of the main portion of the shield plate 19 are separated by a gap, so that the bent sections 20 can easily deform elastically in the direction of thickness.

The tip end of these bent sections 20 extends to the middle in the radial direction (up and down in FIG. 19), so that there is a wide flat surface 26 that is orthogonal to the center axis of the outer race 1 (up and down, and front and back in FIG. 19). Accordingly, the outer surface (right side in FIG. 19) of flat surface 26 has a large area, so that it can come in contact with the end of the insertion jig.

Moreover, in the embodiment shown in the figure, by forming an inclined surface 27 in the middle in the radial direction of the main portion of the shield plate 19, the radially inner half of the shield plate 19 expands toward the outside in the width direction (right side in FIG. 19) of the rolling bearing. By expanding the radially inner half of the shield plate 19 in this way toward outside, the volume of the space 28 between the pair of shield plates 19 attached to both ends in the radial direction of the outer race 1 is increased, and makes it possible to maintain an adequate amount of grease in this space.

When constructing the sealing device for rolling bearing of this embodiment of the invention, the shield plates 19, constructed as described above, are attached in the shield grooves 8 which are shaped as described above around the inner peripheral surface on both ends of the outer race 1. When doing this, the bent sections 20 are faced toward the outside (the side opposite of where the rolling elements 5 are located), and the shield plates 19 are installed on the inside of the outer race 1. After they have been installed, as the outer peripheral edge of the shield plates 19 is attached to the shield grooves 8, the bent sections 20 come in contact with the protruding section 18.

Also, in the case of this embodiment, as in the case of the first embodiment described above, the height of only a part of the several bent sections 20 is made a little larger than the width of the shield groove 8, and the height of the remaining bent sections 20 is less than this width. The difference between this embodiment and the first embodiment is that the bent sections 20 are folded in the opposite direction. All other construction and function are nearly the same and so any redundant explanation will be omitted.

The reason that a flat section 21 is formed on the shield plate 19 in the first embodiment, and that a flat surface 26 is formed on the shield plate 19 in the second embodiment, is to provide a surface that is wide enough for the insertion jig to come in contact with when inserting the shield plates 19, and to prevent part of the shield plates 19 from plastically deforming. This is not directly related to the first objective of this invention, which is to maintain the roundness of the outer race 1. Also, depending on the conditions of use, if a little plastic deformation is allowed, or if the shape of the insertion jig or the material of the shield plate make it possible to prevent plastic deformation, the flat section 21 or flat surface 26 can be omitted.

Figure 24:
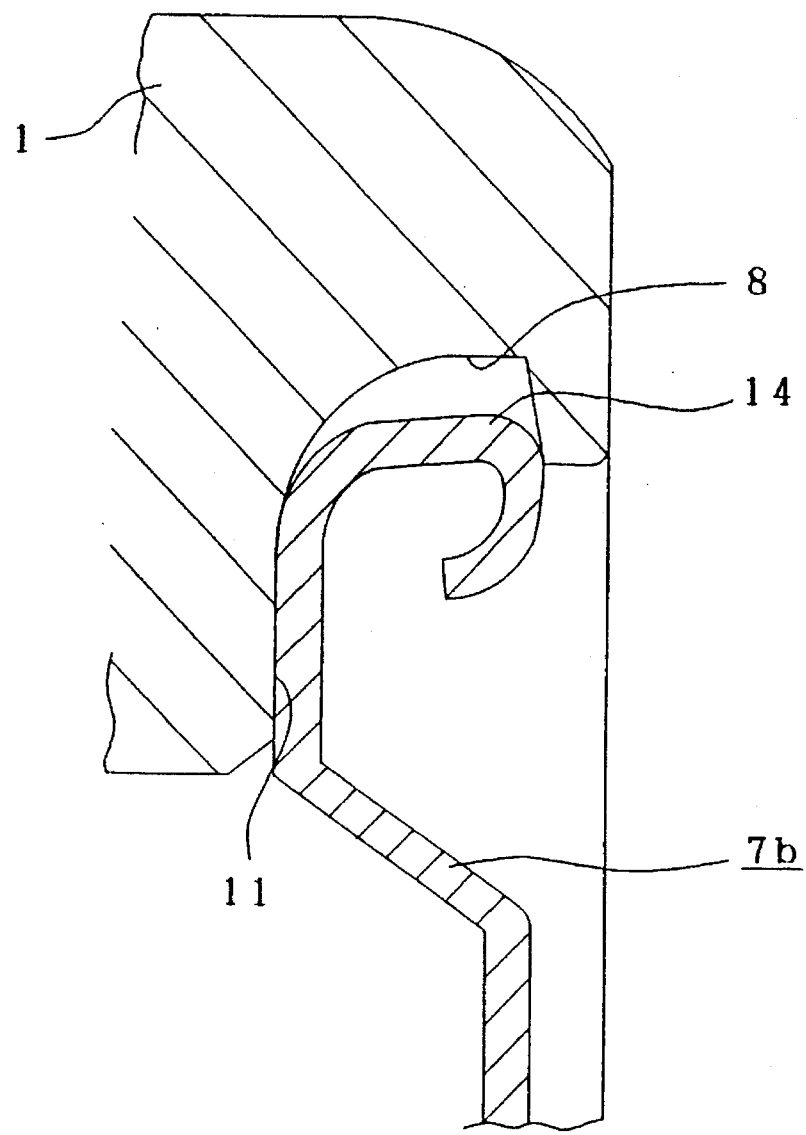
FIG. 24 is a cross-sectional, partial view showing a third example of a conventional sealing device.
Figure 25:
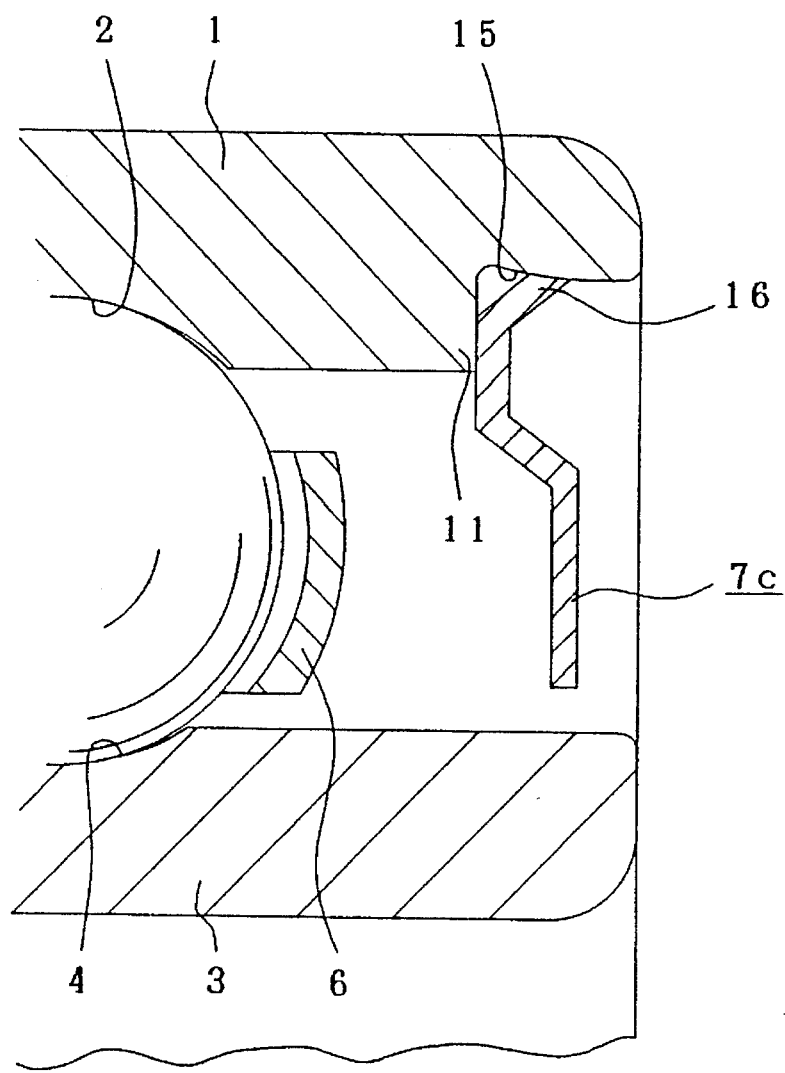
FIG. 25 is a cross-sectional, partial view showing a fourth example of a conventional sealing device.

Furthermore, this invention can be applied to the construction shown in FIG. 24, and also in the construction shown in FIGS. 21 and 22. When it is applied to the construction shown in FIG. 24, it is used nearly the same as described in the embodiments above. When it is applied to the construction shown in FIGS. 21 and 22, first, by pushing and deforming the bent sections 10, which are shaped as shown in FIG. 21, a little in the axial direction of the bearing, the outer peripheral edge of the bent sections 10 are all fitted inside the shield groove 8. In this state, the shape of the cross-section of the bent sections 10 is somewhere between the shapes shown in FIGS. 21 and 22, and due to the spring-back characteristics of the material of the bent sections 10, they fit securely into the shield groove 8. Next, although there is not a wide area for pushing, the bent sections 10 (except for a some in the circumferential direction), having a cross-sectional shape between the shapes shown in FIGS. 21 and 22, are pushed and deformed even further, so that contact pressure between the shield groove 8 and the bent sections 10 that are pushed in even further is lost. Only the remaining bent sections 10 that were not pushed in further and which have a height that is larger than the others, come in contact elastically with the shield groove 8.

In order that the bent sections 10 that were pushed in further do not press strongly against the inner surface of the outer race 1, the outer diameter of these bent sections 10 is made to be a little smaller than in the cases of the prior construction. In this case, it is not possible to reduce the manufacturing cost, however it is possible to improve the roundness and reduce the variation as in the embodiments described above. The ratio of the length of the remaining bent sections that were not pushed in further is the same as described above.

The sealing device for rolling bearing of this invention, which is constructed and functions as described above, improves the roundness of the outer race with shield plate installed in it, and makes it possible to improve the yield of products. As a result, it is possible to obtain at relatively low cost, a high-performance rolling bearing with sealing device in which it is difficult for harmful vibrations to occur.

What is claimed is:

1. A sealing device for use in a rolling bearing comprising an outer race having an opening end and an inner peripheral surface formed with an outer raceway, an inner race having an outer peripheral surface formed with an inner raceway, and a plurality of rolling elements rotatably provided between the outer raceway and the inner raceway, comprising a shield groove formed generally circumferentially adjacent to the outer raceway on the inner peripheral surface of the outer race, and a shield plate having an outer peripheral edge attached to the shield groove and an inner peripheral edge provided near the outer peripheral surface of the inner race, the inner peripheral surface of the outer race having a stepped section having a relatively large step between the outer raceway and the shield groove, and a protruding section having a relatively small step near the opening end of the outer race, so that the shield groove is defined by the stepped section and the protruding section, the shield plate shaped into a circular ring and having a radially inner disc portion to form the inner peripheral edge and a plurality of circumferentially arrayed edge portions and notches located between the adjacent edge portions to form the outer peripheral edge, the edge portions shaped in an elastically deformable bent structure, such that part of the edge portions of the shield plate is larger in bulging than the remaining part, whereby the shield plate is attached to the shield groove with the edge portions in contact with the stepped section in the condition that only part of the edge portions functions as a prop between the stepped section and the protruding section, while the remaining bent sections is substantially engaged with the stepped section and with the protruding section.

2. The sealing device of claim 1, wherein the shield plate is formed from a sheet metal by cutting the notches around the sheet metal to leave the edge portions between the adjacent notches and bending the edge portions in a same front-back direction with reference to the sheet metal, so that the edge portions bulge in the elastically deformable bent structure.

3. The sealing device of claim 1 wherein the shield groove and the bulging edge portions have a surface portions, respectively, such that there is a small clearance between the surface portion of the shield groove and the surface portions of the edge portions.

4. The sealing device of claim 1 wherein the radially inner disc portion has a flat radially outer portion and a curved radially inner portion arc-shaped in cross section.

5. The sealing device of claim 1 wherein the edge portions have a flat tip end placed closer to the opening edge of the outer race and extending radially inward to form a flat surface orthogonal to the axis of the outer race.

6. The sealing device of claim 5, wherein the radially inner disc portion has a tapered intermediate portion extending toward the opening of the outer ring and a radially inner most portion continued to the tapered intermediate portion and placed closer to the opening end.

7. The sealing device of claim 1, wherein the edge portions have a tip end placed closer to the opening end of the outer race, and has a flat portion in contact with the stepped section.

8. The sealing device of claim 1, wherein the edge portions have a tip end placed in contact with the stepped section.

9. The sealing device of claim 1, wherein at least one of the edge portions bulges largely, and two of the edge portions adjacent to the at least one edge portion has one end closer to the at least one edge portion bulges largely, so that the at least one edge portion and the one end closer to the at least one edge portion form the part of the edge portions.

10. The sealing device of claim 1, wherein at least one of the edge portions has opposite ends which bulge largely to provide a concave outer surface, so that the opposite ends form the part of the edge portions.

11. The sealing device of claim 1, wherein at least one of the edge portions has a central portion which bulges largely to provide a convex outer surface, so that the central portion forms the part of the edge portions.

12. The sealing device of claim 1, wherein at least one pair of the edge portions have ends with one of the notches therebetween which bulge largely, so that the bulging ends of the at least one pair of the edge portions form the part of the edge portions.

13. The sealing device of claim 1, wherein the part of the edge portions extends one forth of the total circumference of the shield plate.

14. The sealing device of claim 1, wherein the part of the edge portions extends one sixth of the total circumference of the shield plate.

15. The sealing device of claim 1, wherein the shield plate is pressed into the outer race with an insertion jig having a press-force adjusting means.

* * * * *